United States Patent Office 2,813,591
Patented Nov. 19, 1957

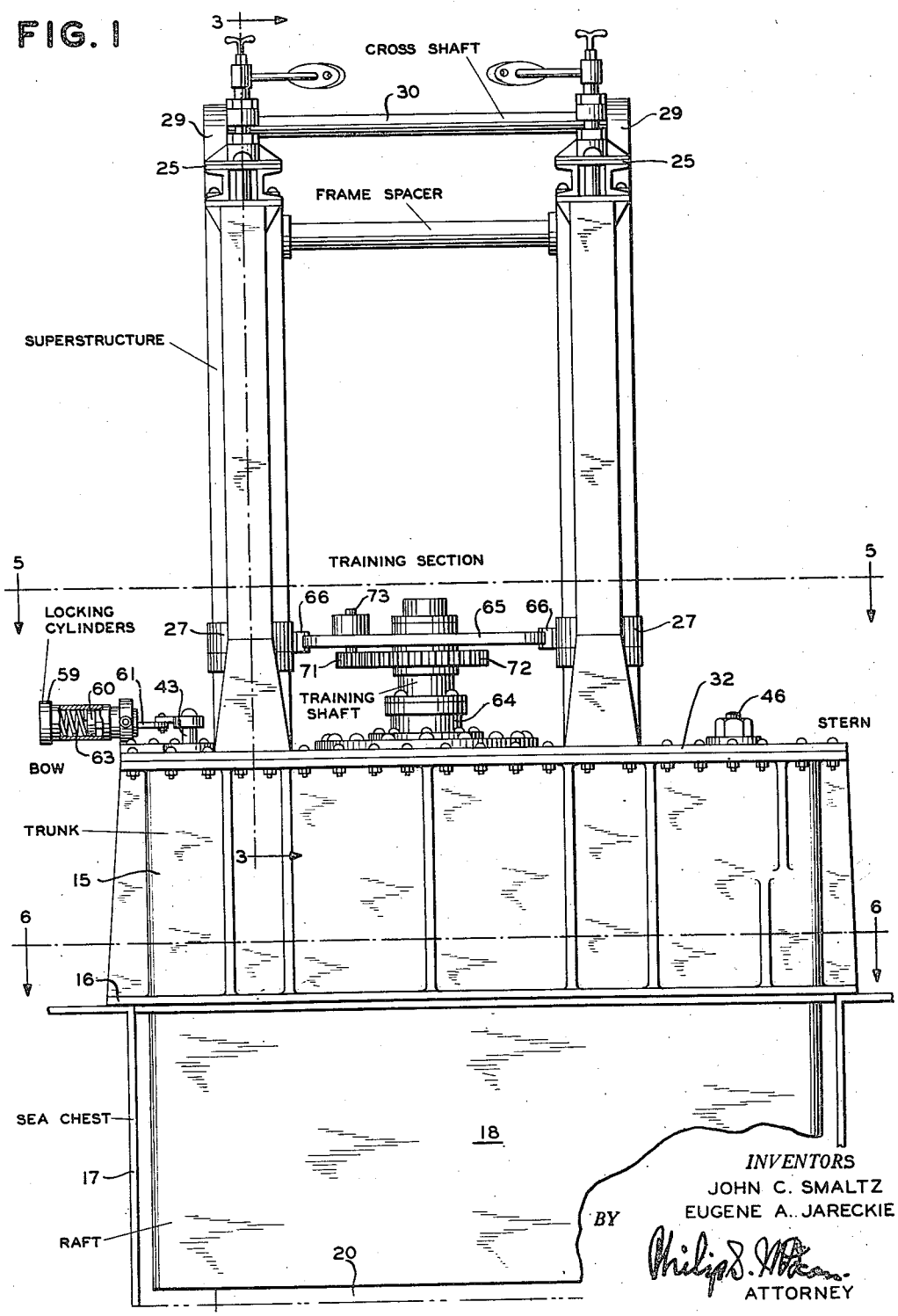

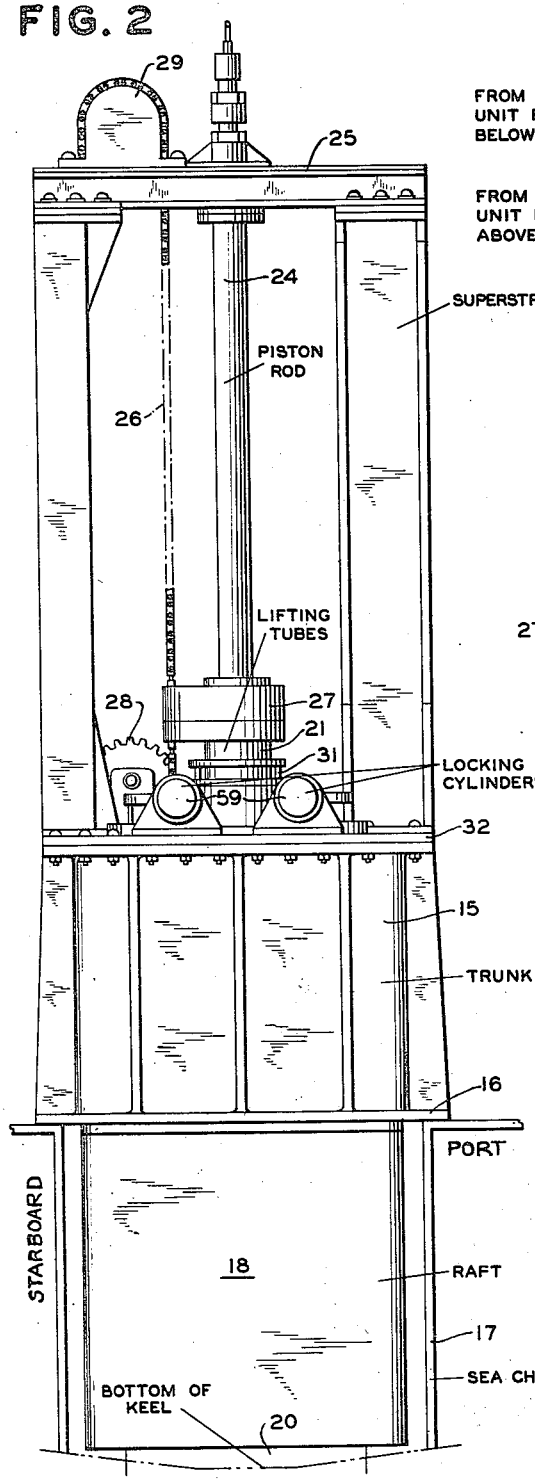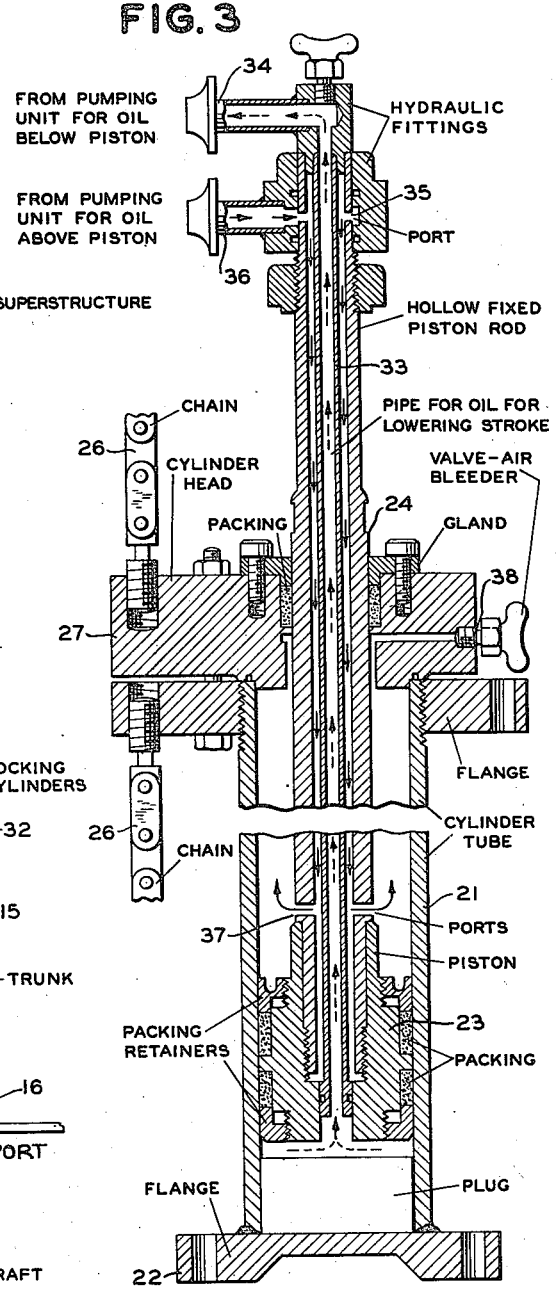

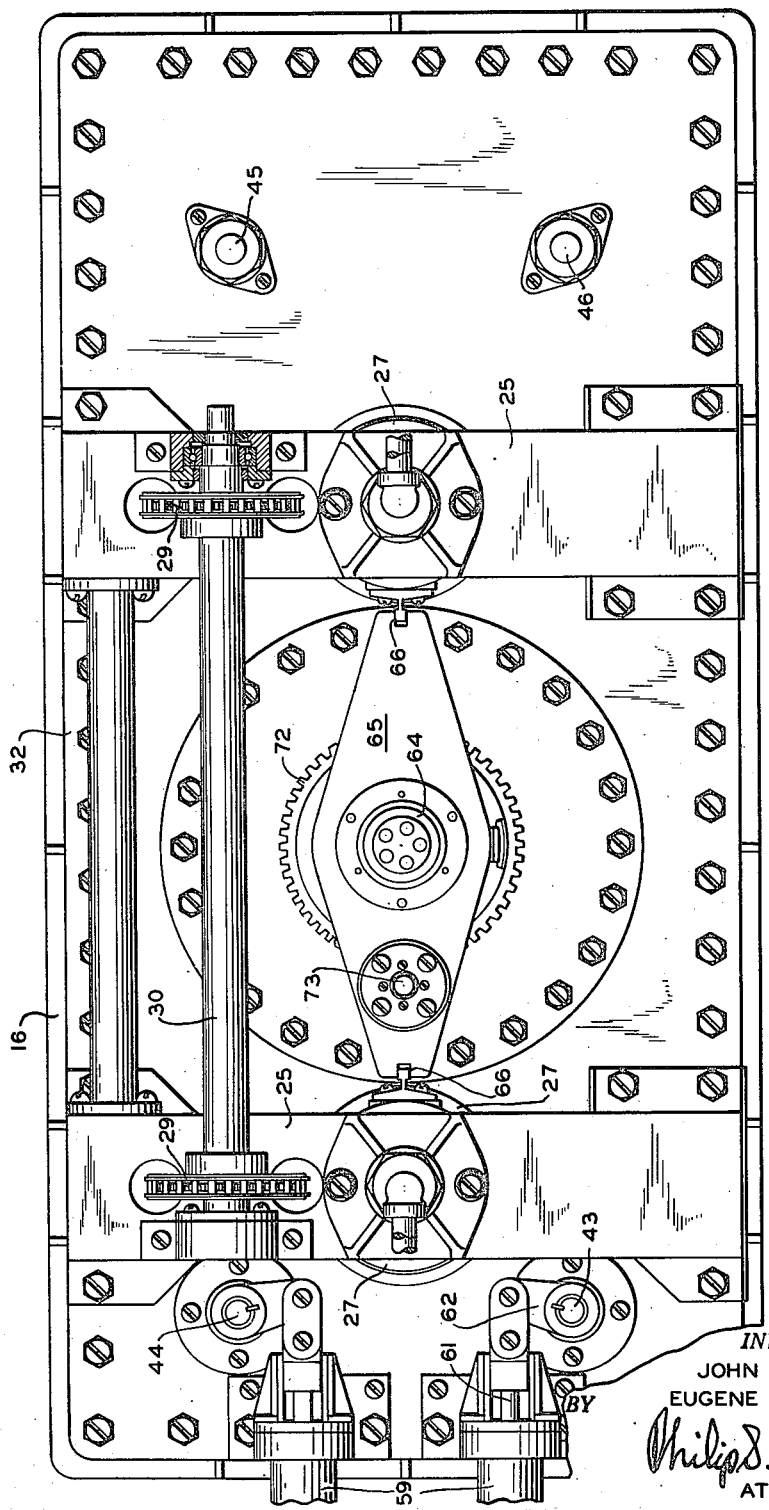

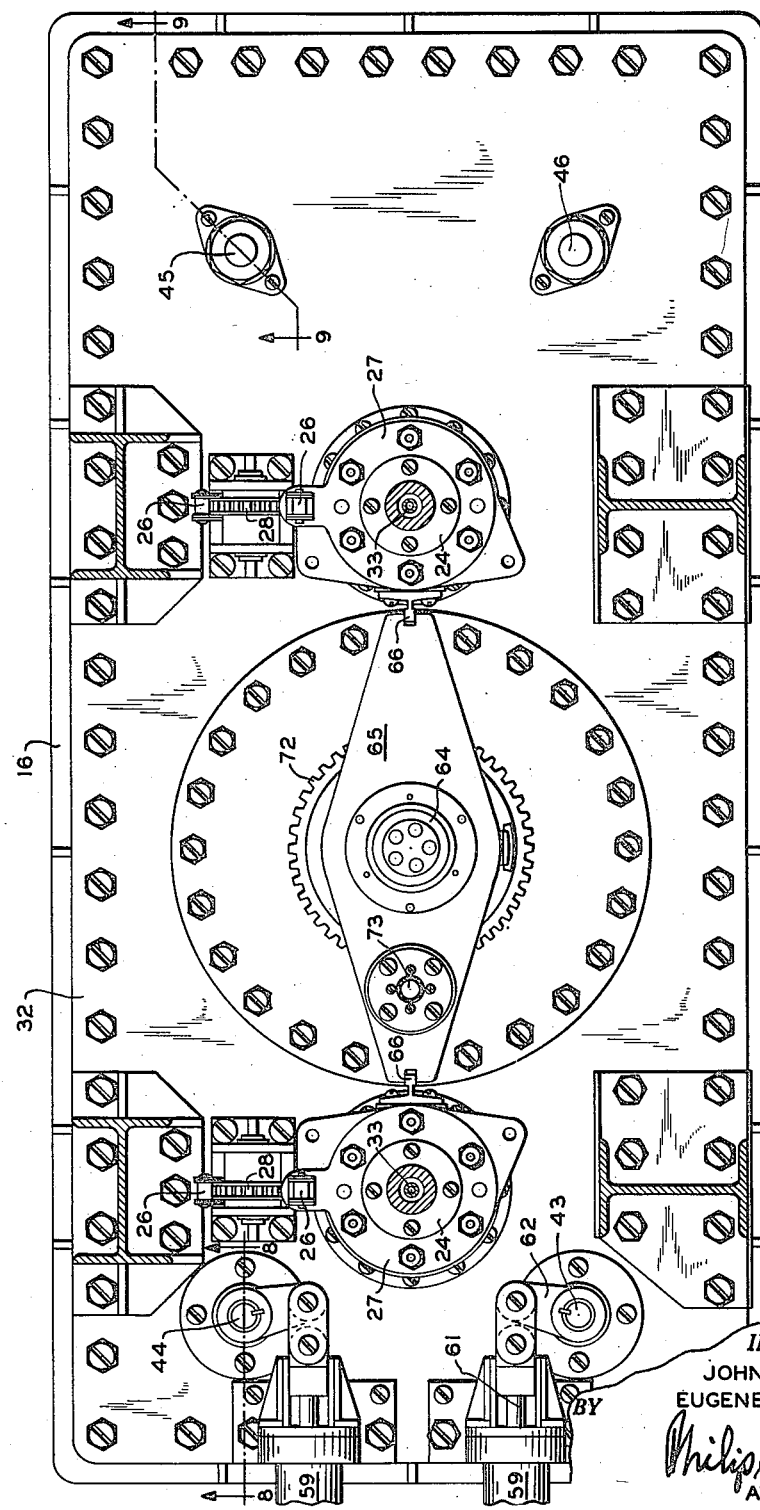

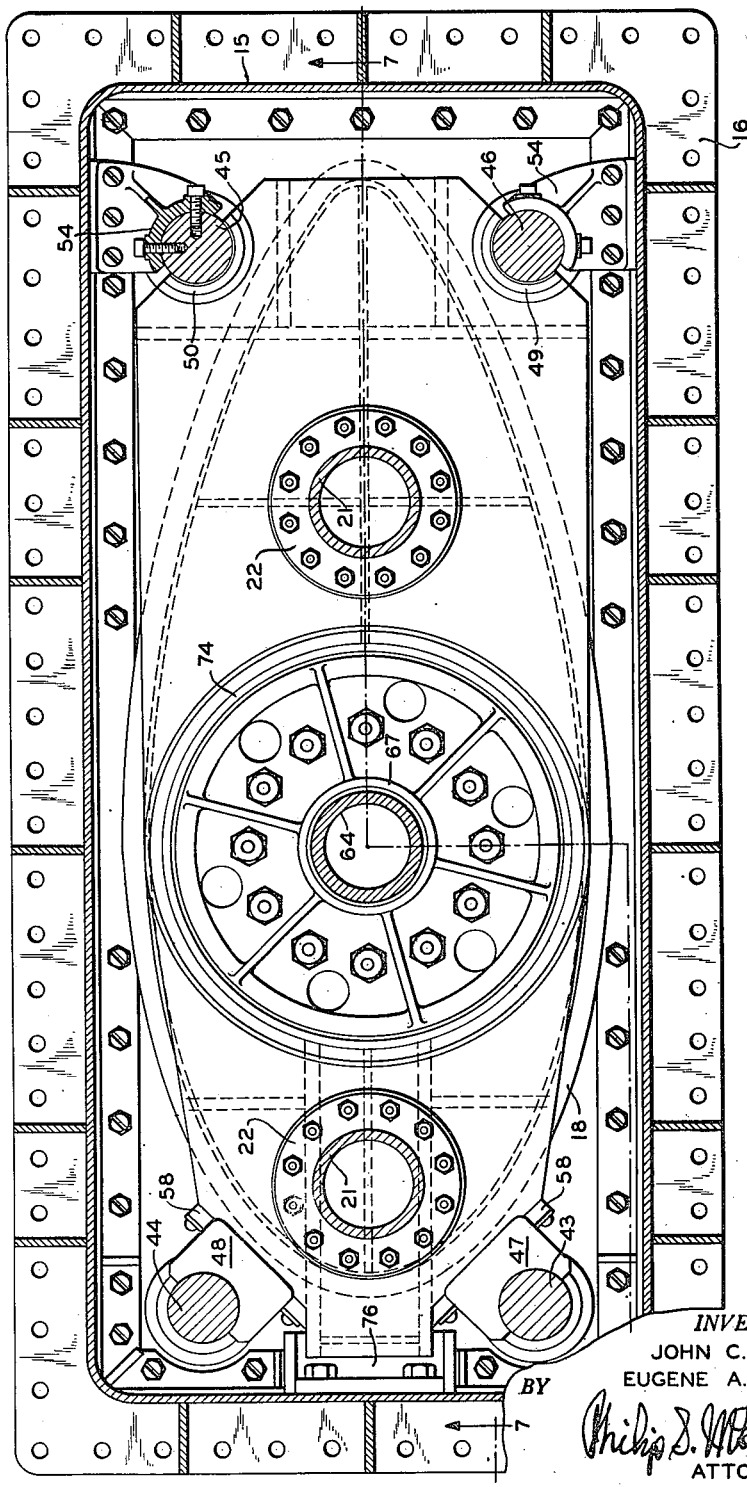

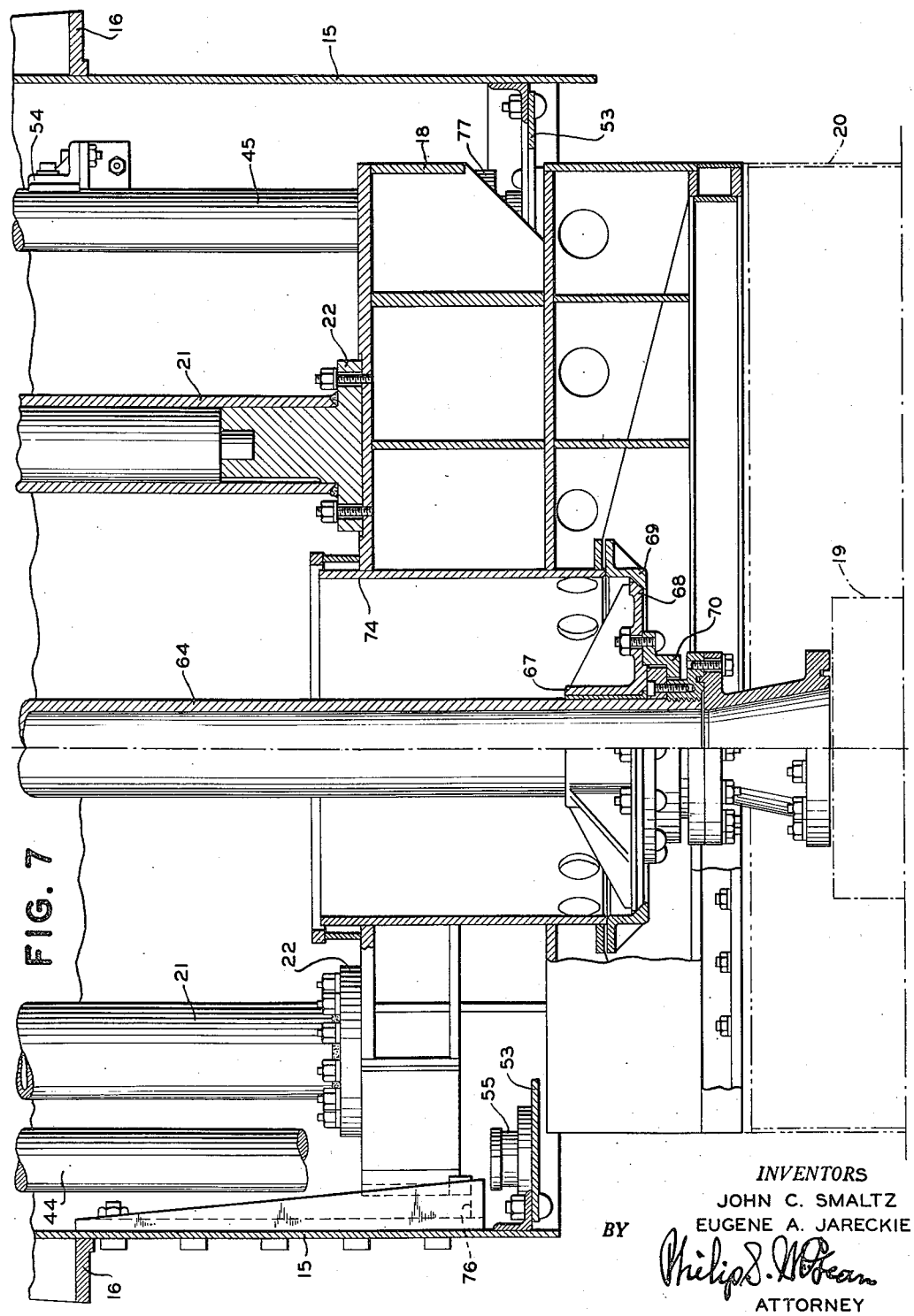

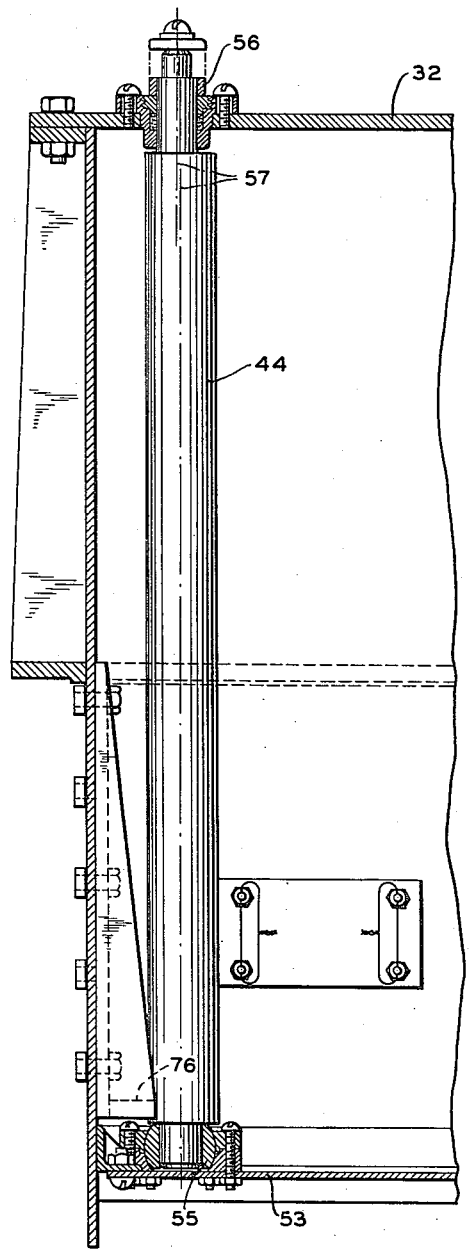
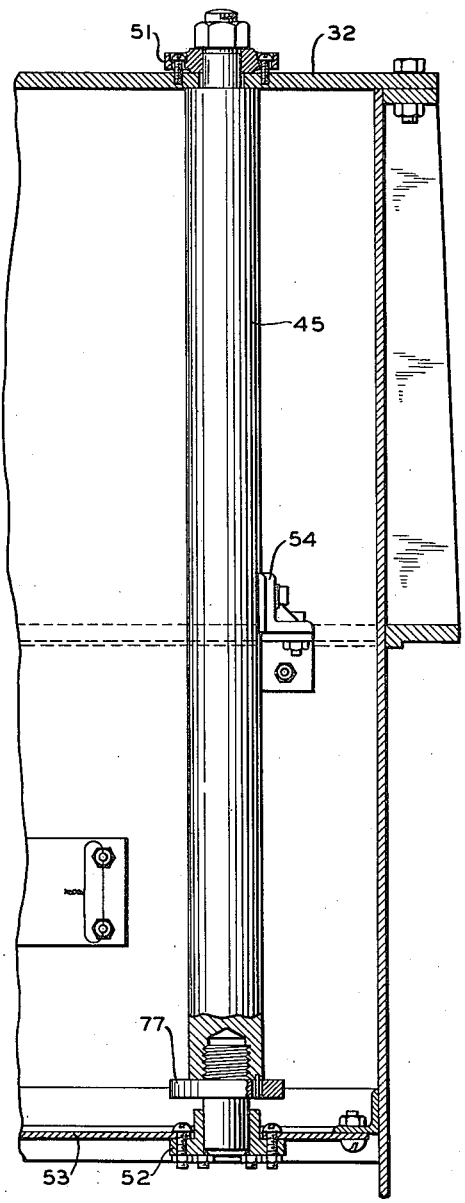

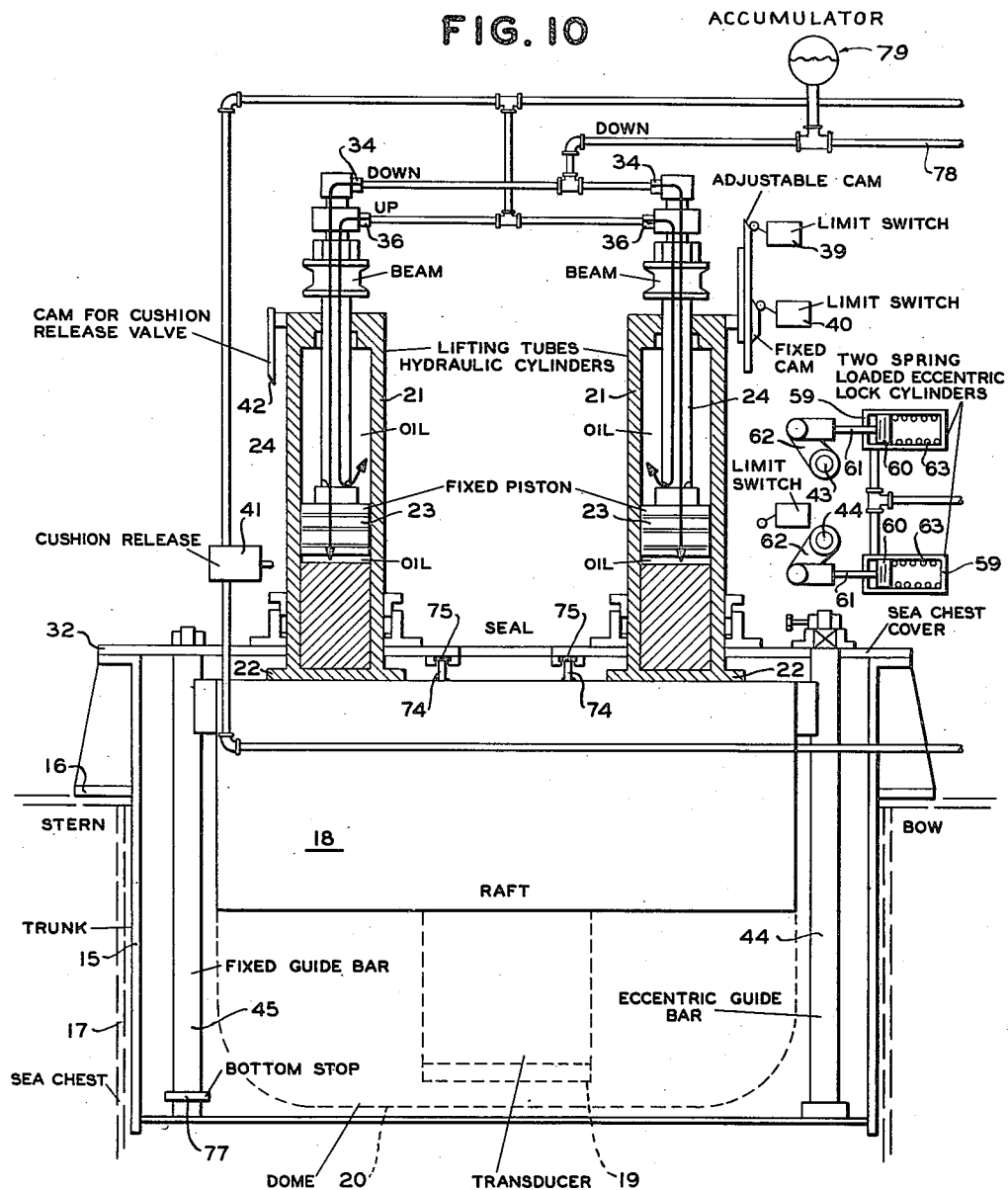

2,813,591

GEAR FOR PROJECTING AND RETRACTING UNDERWATER SOUND TRANSLATING APPARATUS

John C. Smaltz, New York, N. Y., and Eugene A. Jareckie, Madison, N. J., assignors to McKiernan-Terry Corporation, Harrison, N. J., a corporation of New Jersey Application July 12, 1954, Serial No. 442,666

17 Claims. (Cl. 181—.5)

The invention disclosed in this patent application relates to mechanism for projecting and retracting underwater sound translating apparatus such as employed in Sonar service.

This apparatus, projected from the bottom of a traveling ship, is subjected to particularly severe strains and a problem has been to hold the transducer against rattling and vibration and yet have it free enough for lifting and lowering movements of the raft structure carrying the same.

This problem has been solved in the present invention by the employment of guides for the up and down movement of the raft, adjustable about their axes and having sufficient eccentricity in such adjustment to smoothly guide and hold without actually binding the raft against movement.

Another problem has been to accomplish rapid but smooth up and down raft motion with positive but not too abrupt stops at both ends of such movement.

This has been accomplished in the present invention through the medium of hydraulic cylinders connected with the raft and combined with pistons supported relatively stationary and with limit switches controlling the hydraulics at the top and bottom of the stroke and a cushioning valve for automatically slowing down the raft just before reaching bottom position.

Other features of the invention relate to the steadying of the transducer shaft in its lowered, projected position and to the sealing of the transducer to the sea chest cover in the raised position to afford access to transducer parts while the ship is afloat.

Other desirable objects and features of the invention are set forth or will appear in the course of the following specification.

The drawings accompanying and forming part of the specification illustrate a present practical embodiment of the invention. Actual structure, however, may be modified and changed as regards the immediate illustration, all within the true intent and scope of the invention as hereinafter defined and claimed.

Fig. 1 in the drawings is a broken side elevation of the hoist mechanism as installed and combined with the sea chest which for the purpose is built into the keel of the ship;

Fig. 2 is a bow end elevation of the hoist mechanism;

Fig. 3 is an enlarged broken sectional view of one of the hydraulic cylinders, taken on substantially the line 3—3 of Fig. 1;

Fig. 4 is a broken top plan view of the equipment;

Fig. 5 is a generally similar view but taken on a lower plane, as on line 5—5 of Fig. 1, parts appearing in section as on that plane;

Fig. 6 is a lower horizontal sectional view through the trunk or sea chest, as on substantially the plane of line 6—6 of Fig. 1;

Fig. 7 is a broken vertical sectional view as on substantially the plane of line 7—7 of Fig. 6;

Fig. 8 is a broken vertical sectional view of one of the forward eccentric guides, as on substantially the plane of line 8—8 of Fig. 5;

Fig. 9 is a similar view of one of the aft fixed guides appearing as on substantially the plane of line 9—9 of Fig. 5;

Fig. 10 is a part sectional side elevation and diagrammatic view illustrating mounting of the hoist in the keel of the ship.

Figs. 1 and 2 show how the complete hoist mechanism may be built into a single compact unit on a base having the form of a trunk 15 flanged at 16 for mounting on a sea chest built into the hull of a ship.

This sea chest is indicated more or less diagrammatically at 17 in Fig. 10, and the latter view may be referred to at this point as showing the raft 18 guided for vertical movement in the trunk and carrying the transducer or other such element 19 enclosed in dome 20.

Vertical movement of the raft is effected by hydraulic cylinders 21 bolted to the top of the raft at 22, Fig. 7, operating over stationary pistons 23 carried by tubular piston rods 24 supported from the superstructure frame 25.

These hydraulic cylinders are located near opposite ends of the raft and are held in synchronism by equalizing chains 26 connected with the upper cylinder heads 27 and operating in loop formation over sprockets 28 at the bottom and sprockets 29 at the top on a cross shaft 30.

The cylinders 21 operate down through stuffing boxes 31 in the sea chest cover 32.

This combination of stationary piston and traveling cylinder provides desirable, substantial extended connection with the raft and enables all lubrication of the piston and piston rod to be taken care of inside the ship and with no loss of oil traces to the sea.

The stationary tubular piston rod 24, as shown in Fig. 3, accommodates an inner pipe 33 which extends from a supply and exhaust fitting 34 at the top down through the piston head for controlling oil below the head, and the rod itself is shown ported at the top at 35 for a supply and exhaust connection 36 by which fluid may be admitted and exhausted by way of lower ports 37 into and from the space above the piston head.

A bleeder 38 in the upper cylinder head enables trapped air to be released so that action will be positive in both directions.

It will be apparent that with hydraulic fluid released from the cylinders above the piston and admitted to the space below the piston the cylinders will be lowered to project the raft, and that with fluid released from below the piston and admitted to space above the piston the cylinders will be raised to retract the raft.

Vertical travel of the cylinders and raft structure may be determined by limit switches such as indicated at 39, 40.

Additionally, it is desirable to cushion the bottoming movement of the raft. This is accomplished in the illustration by means of a cushioning valve 41 actuated by a cam 42 on the aft cylinder head just prior to end of downward movement and connected to gradually release, through needle valve action or the like, the remainder of the oil trapped above the piston after closing of the main "down" valve.

The raft is guided, in the present disclosure, on four upright guide bars 43, 44, 45, 46 spaced in the four corners of the trunk 15.

These bars are shown as cylindrical shafts and the raft is shown as carrying semi-cylindrical shoes 47, 48, 49, 50 slidingly engaging these shafts.

The special feature of this arrangement is that the two after shafts 45 and 46 are fixed and rigid to form solid abutments for the raft, while the forward shafts 43 and 44 are rotatable about their axes and have sufficient eccentricity to either positively grip and hold the raft against the stationary guides or to release the raft for free up and down vertical movement.

Fig. 9 shows how the aft guides 45, 46 are solidly supported at top and bottom, at 51 and 52 in the sea chest cover 32 and bottom frame plate 53 of the trunk.

In this view and in Figs. 6 and 7, intermediate braces 54 are shown for reinforcing and bracing the intermediate portions of the stationary guide bars against the thrust of the forward eccentric bars 43, 44.

Fig. 8 shows how the eccentric guide bars 43, 44 may be journaled at their lower ends in self-aligning bearings 55 supported on the bottom frame plate 53 and be supported at the top in plain bearings 56. In this view the eccentricity of these rotatable guides is indicated to an exaggerated extent at 57.

To prevent binding of the sliding shoes 47, 48 through rotation of the eccentric shafts, these shoes are shown in Fig. 6 as slidingly guided for movement transverse to the axis of guides 43, 44 over angled gibs 58 at the forward corners of the raft. Consequently, with turning movement of the eccentrics the shoes may slide transversely on the corners of the raft sufficiently to avoid binding and to relieve the raft of any twisting moment.

The eccentric guides 43, 44 may be tensioned to normally hold or lock the raft in any position in which it may be located.

This is accomplished in the illustration by locking cylinders 59 containing pistons 60 connected by rods 61 with crank arms 62 on the upper exposed ends of the rotatable eccentric guide bars 43, 44, springs 63 acting on these pistons to impart turning movement required to set the eccentrics against the raft.

In the illustration, Figs. 4 and 5, the parts are arranged to turn the eccentric shafts 43, 44 in reverse directions, inwardly toward each other so as to exert a centralizing effect on the raft.

To release the clamping, locking effect, hydraulic pressure is admitted to locking cylinders 59 in opposition to the spring effect.

This unlocking action may be automatic so that as a part of the lifting and lowering operations, the locking pressure will be taken off the raft before or as the hydraulic cylinders are actuated to apply lifting or lowering force. Also, the controls may be such that the locking effect of the cylinders will come on automatically when lifting or lowering is discontinued.

As a result the raft will be solidly held in all positions at rest and will only be released for up and down movement when such action is desired.

The eccentric locking action of each guide shaft is preferably left independent of the other so that they will operate in self-equalizing fashion and will not require critical or other adjustment to compensate for wear or the like.

The transducer is shown supported in the raft on the lower end of a training shaft 64 journaled at the top in a yoke 65 keyed to the two cylinder heads 27, at 66, Figs. 1 and 4, and journaled at the lower end in a steady bearing 67 having a self-centering bevel engagement at 68 with a stationary bearing ring 69 at the lower side of the raft.

The steady bearing 67 is shown in Fig. 7 as carrying a thrust bearing 70 supporting the training shaft.

Angular adjustment of the training shaft about its axis is effected in the illustration by a pinion 71 journaled in the yoke and in mesh with a gear 72 fixed on the shaft, said pinion having an exposed shaft head 73 operable by a wrench or the like.

The annular support for the steady bearing is shown in the form of a cylindrical well 74, Fig. 7, which will seal against a gasket formation 75 in the sea chest cover when the raft is raised to top position. This construction enables inspection and removal of transducer parts if such be necessary.

The raft constituting support and carrier for the signal apparatus, is normally held firmly against vibration but may be raised and lowered and supported at all intermediate positions. When fully raised the transducer or other parts carried by the raft may be reached for attention of any sort.

In the fully lowered or projected position the raft may be supported on a stop 76 between and clear of the adjustable guides 43, 44, Fig. 6 at the forward end and on stop collar 77 on the stationary guides 45, 46 at the aft end, Figs. 7, 8 and 9. This provides solid three-point support for the raft in fully lowered position without loading the rotatably adjustable eccentric guides at the bow end. Consequently, these eccentric guides remain free for adjustment either for locking or for releasing the raft.

The eccentric guides are thus kept free for operation in all positions of the raft and therefore are operative to lock or hold the raft firmly and positively against vibration in all up and down positions of the raft. When raising or lowering, pressure of the eccentrics is released so that quick up and down movement is not hindered.

While the eccentric guides may assist in holding the raft in any position to which it has been adjusted, the actual supporting of the raft in any set position is provided by the oil in the hydraulic cylinders so that there is no undue wear or transverse loading on the guides.

The power plant for supplying the hydraulic pressure for operating the equipment, including motor driven pump, pipe connections, valves, control switches and the like are not shown, but some of the essential connections and controls are indicated more or less diagrammatically in Fig. 10.

For convenience the motor and pump may be mounted on a separate base adjoining the hoist unit and the controls, in the form of push-button switches or the like, be disposed at one or more properly located stations.

In the presently approved arrangement the connections are such that when the motor driving the pump is started, pressure will be delivered to the locking cylinders 59, thus releasing the guide bars to permit free upward and downward motion of the raft. Conversely, when the motor is stopped pressure is released from the locking cylinders, enabling the springs 63 to effect locking of the raft in place.

In the down position pressure is kept in the cylinders beneath the pistons 23 to guarantee that the raft will be held firmly seated against the bottom stops 76, 77.

This is accomplished automatically by connecting an accumulator 79 with the down line indicated at 78 in Fig. 10, which will be charged with pressure during normal operation and which will react to apply this pressure at the end of the downward movement of the raft. The cushioning valve 41, connected as it is to the top of the piston, remains open in the down position permitting the accumulator pressure existing on the under side of the piston to have full force and effect to force the raft 18 down against its limiting and supporting stops.

Then, if there is any abnormal upward force resulting from wave action or the like tending to lift the raft, the pressure from the accumulator will react to hold the raft in the bottom position solidly seated on the stops.

What is claimed is:

1. Hoist for projecting and retracting underwater signal equipment, comprising a raft for supporting said equipment, guides for directing said raft in projecting and retracting movements of the same, means for effecting projecting and retracting movements of said raft over said guides, certain of said guides being rotatable about an axis parallel to the movement of said raft and having bearing surface eccentric to the axis of adjustment and means for effecting rotation of said guides to vary the eccentric adjustment of said guides.

2. Hoist for projecting and retracting underwater signal gear comprising an underwater trunk, a raft operable in said trunk, guides for said raft in opposed relation in said trunk, at least one of said guides being rotatably adjustable about a longitudinal axis and having a guiding surface for the raft eccentrically related to said axis and operable to hold the raft against the opposing guide by rotational adjustment of said one of said guides, means for shifting the raft over said guides and means for effecting rotary adjustments of said guide having the eccentric guiding surface.

3. The invention according to claim 2, further comprising two fixed guides and two rotatably adjustable guides in rectangular arrangement.

4. The invention according to claim 3, further comprising bearing members on the raft in engagement with the adjustable guides, said bearing members being mounted for movement transverse to the axes of the adjustable guides.

5. The invention according to claim 3, further comprising bearing shoes on the raft slidingly engaged with the rotatably adjustable guides and said shoes having sliding movement on the raft on axes transverse to the axes of said adjustable guides.

6. The invention according to claim 3, in which said guides are in the form of shafts and guide shoes on the raft in sliding engagement with the rotatably adjustable guide shafts, said shoes being slidably supported on the raft for movement transverse to the axes of adjustment of said shafts.

7. The invention according to claim 3, in which the means for effecting adjustment of the eccentric guides include hydraulic cylinders and pistons and springs for opposing the action of said hydraulic cylinders and pistons.

8. The invention according to claim 3, further comprising stop means supporting the raft in projected position and including stop shoulders at the stationary guides and a companion stop shoulder between and clear of the rotatably adjustable guides.

9. The invention according to claim 2, further comprising a bearing member on the raft engaging said rotatably adjustable guide and said bearing member having a sliding mounting on the raft and movable transversely to the axis of the adjustable guide.

10. The invention according to claim 2, in which the means for effecting rotary adjustment of said guide includes a hydraulic cylinder and piston couple connected to impart rotative movement to said guide, and spring means for opposing the action of said couple.

11. Hoist for projecting and retracting underwater signal gear, comprising guide shafts in opposed parallel relation, a raft guided over said shafts, at least one of said shafts being journaled for rotary adjustment about a longitudinal axis and having eccentric bearing surface, a guide shoe on the raft engaged with said eccentric bearing surface and free for self-adjustment along an axis transverse to the axis of adjustment of said guide shaft, means for rotating said guide shaft to effect holding and release of the raft and means for shifting the raft over the guide shafts.

12. The invention according to claim 2, further comprising stop means for supporting the raft in projected position independently of said rotatably adjustable guide.

13. Hoist for projecting and retracting underwater signal or other gear, comprising a movable raft, hydraulic cylinder and piston couples connected to shift said raft, guides for directing the projecting and retracting movement of said raft, at least one of said guides being eccentrically adjustable about a longitudinal axis to hold the raft against vibration, spring means for retaining said eccentrically adjustable guide in raft holding position, hydraulic means for shifting said eccentrically adjustable guide to about its longitudinal axis to raft releasing position and hydraulic pressure connections to both said cylinder and piston couples and hydraulic mechanism to automatically effect the releasing movement of said eccentrically adjustable guide when hydraulic pressure is supplied for shifting the raft.

14. Hoist for projecting and retracting underwater signal or other gear comprising a raft, hydraulic means for projecting and retracting said raft, opposed substantially parallel relatively movable guides for said raft relatively shiftable in parallel relation toward and away from the raft into gripping or releasing relation in respect to the raft in different positions of the raft along the always parallel guides and means for effecting said relative adjustment of said parallel guides to hold or release the raft at different positions of the same along the guides.

15. Hoist for projecting and retracting underwater signal or other gear comprising a raft, hydraulic means for projecting and retracting said raft, opposed substantially parallel relatively movable guides for said raft relatively shiftable in parallel relation toward and away from the raft into gripping or releasing relation in respect to the raft in different positions of the raft along the always parallel guides and means for effecting said relative adjustment of said parallel guides to hold or release the raft at different positions of the same along the guides, including spring means for effecting the holding engagement of said guides with the raft and hydraulic mechanism for effecting the raft releasing movement of the guides.

16. Hoist for projecting and retracting underwater signal or other gear comprising a raft, hydraulic means for projecting and retracting said raft, opposed substantially parallel relatively movable guides for said raft relatively shiftable in parallel relation toward and away from the raft into gripping or releasing relation in respect to the raft in different positions of the raft along the always parallel guides and means for effecting said relative adjustment of said parallel guides to hold or release the raft at different positions of the same along the guides, including spring means for effecting the holding engagement of said guides with the raft and hydraulic mechanism for effecting the raft releasing movement of the guides and control connections to said hydraulic means for shifting the raft and to said hydraulic mechanism for releasing the guides from the raft arranged to automatically effect release of the raft when hydraulic pressure is applied for shifting the raft.

17. Hoist for projecting and retracting underwater signal or other gear comprising upright parallel stationary pistons and tubular piston rods, movable parallel hydraulic cylinders operating over said upright stationary pistons and piston rods, a raft connected with the lower ends of said movable cylinders, upright guides for the raft disposed in parallel relation at the outer sides of the cylinders and mounted for relative movement in parallelism toward and away from each other to grip or release the raft in various positions of the raft along the guides, a bottom stop for limting the projection of the raft, gearing connecting the movable cylinders in synchronized relation, hydraulic connections with the upper ends of the tubular piston rods for applying lifting and lowering forces through the piston rods and pistons to said raft raising and loweirng cylinders, hydraulic means for relatively shifting the relatively movable raft guides and connected with said hydraulic connections for automatically releasing the raft from the guides when power is applied to the cylinders for shifting the raft, valve means operable by the movable cylinders for cushioning engagement of the raft with the bottom stop and an accumulator connected with said hydraulic connections and arranged to apply pressure to aid the cylinders in holding the raft seated on the bottom stop.

References Cited in the file of this patent

UNITED STATES PATENTS

| | | |
|---|---|---|
| 377,840 | Smith | Feb. 14, 1888 |
| 1,362,619 | Hall | Dec. 21, 1920 |
| 1,791,014 | Settegast et al. | Feb. 3, 1931 |

(References on following page)